(12) United States Patent
Van Horn et al.

(10) Patent No.: US 9,890,312 B2
(45) Date of Patent: Feb. 13, 2018

(54) METHOD OF SELECTING REFRIGERANT-LUBRICANT COMBINATIONS

(71) Applicant: Arkema Inc., King of Prussia, PA (US)

(72) Inventors: Brett L. Van Horn, King of Prussia, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/290,141

(22) Filed: Oct. 11, 2016

(65) Prior Publication Data

US 2017/0029680 A1 Feb. 2, 2017

Related U.S. Application Data

(63) Continuation of application No. 13/517,082, filed as application No. PCT/US2010/061258 on Dec. 20, 2010, now Pat. No. 9,481,820.

(60) Provisional application No. 61/290,690, filed on Dec. 29, 2009.

(51) Int. Cl.
| | |
|---|---|
| *F25B 9/00* | (2006.01) |
| *F25B 31/00* | (2006.01) |
| *F25B 31/02* | (2006.01) |
| *C09K 5/00* | (2006.01) |
| *C09K 5/02* | (2006.01) |
| *C09K 5/04* | (2006.01) |
| *C10M 171/00* | (2006.01) |

(52) U.S. Cl.
CPC .............. *C09K 5/045* (2013.01); *C09K 5/041* (2013.01); *C09K 5/044* (2013.01); *C10M 171/008* (2013.01); *C09K 2205/126* (2013.01); *C10M 2203/1006* (2013.01); *C10M 2203/1045* (2013.01); *C10M 2205/0285* (2013.01); *C10M 2207/0406* (2013.01); *C10M 2207/283* (2013.01); *C10M 2209/043* (2013.01); *C10M 2209/1033* (2013.01); *C10M 2211/022* (2013.01); *C10N 2220/301* (2013.01); *C10N 2220/302* (2013.01); *C10N 2220/303* (2013.01); *C10N 2220/305* (2013.01); *C10N 2220/306* (2013.01); *C10N 2240/30* (2013.01)

(58) Field of Classification Search
CPC . C09K 5/00; C09K 5/04; C09K 5/041; C09K 5/042; C09K 5/044; C09K 5/045; F25B 9/002; F25B 9/006; F25B 31/00
See application file for complete search history.

(56) References Cited

U.S. PATENT DOCUMENTS

| | | | |
|---|---|---|---|
| 5,027,606 A | 7/1991 | Short | C09K 5/045 |
| | | | 252/68 |
| 2002/0040975 A1* | 4/2002 | Goble | C09K 5/044 |
| | | | 252/67 |
| 2004/0065110 A1 | 4/2004 | Barratt | B01D 45/06 |
| | | | 62/471 |
| 2004/0089839 A1 | 5/2004 | Thomas et al. | |
| 2007/0069175 A1 | 3/2007 | Thomas et al. | |
| 2009/0241562 A1 | 10/2009 | Thomas et al. | 62/84 |

FOREIGN PATENT DOCUMENTS

WO    WO 2009/124128 A1    10/2009

* cited by examiner

*Primary Examiner* — Frantz Jules
*Assistant Examiner* — Erik Mendoza-Wilkenfel
(74) *Attorney, Agent, or Firm* — Steven D. Boyd

(57) ABSTRACT

The present invention provides methods for selecting refrigerant and lubricant combinations for use in heat transfer cycle systems and provides methods for operating said heat transfer systems. More particularly, the invention provides methods to select lubricant and refrigerant combinations for a heat transfer cycle system wherein at the lower temperatures of the heat transfer cycle the refrigerant and lubricant are miscible and at the upper temperatures of the heat transfer cycle the refrigerant and lubricant are phase separated and such that the density phase inversion temperature of the combination is below the upper operating temperature of the heat transfer cycle.

3 Claims, No Drawings

METHOD OF SELECTING REFRIGERANT-LUBRICANT COMBINATIONS

This application is continuation of U.S. patent application Ser. No. 13/517,082, filed Jun. 19, 2012, which is the United States national phase of and claims priority to International Application serial number PCT/US2010/061258 filed Dec. 20, 2010, which designated the United States, which claims priority to U.S. provisional application Ser. No. 61/290,690 filed Dec. 29, 2009, all of which are incorporated herein by references.

FIELD OF THE INVENTION

The present invention relates to methods for selecting refrigerant and lubricant combinations for use in heat transfer cycle systems and provides methods for operating said heat transfer systems. More particularly, the invention relates to methods used to select lubricants and refrigerants combinations for a heat transfer cycle system wherein at the lower temperatures of the heat transfer cycle the refrigerant and lubricant are miscible and at the upper temperatures of the heat transfer cycle the refrigerant and lubricant are phase separated and such that the density phase inversion temperature of the combination is below the upper operating temperature of the heat transfer cycle.

BRIEF SUMMARY OF THE INVENTION

The miscibility between refrigerants and lubricants in heat transfer systems, such as vapor-compression refrigeration systems, is important in determining the performance of such systems. In many cases, miscibility between the lubricant and refrigerant at all conditions of operation is preferred in order to ensure adequate lubrication, sufficient circulation of lubricant in the system, and maintain efficient heat transfer in critical system components. However, many combinations of refrigerants and lubricants exhibit phase separation at elevated temperatures. A method of selecting refrigerant and lubricant combinations has been discovered that uses such phase separating combinations of refrigerants and lubricants that also exhibit the property of density phase inversion. At temperatures below the "phase inversion temperature" the lubricant-rich phase is less. dense than the refrigerant-rich phase while at temperatures above the "phase inversion temperature" the refrigerant-rich phase is less dense than the lubricant-rich phase. The temperature at which a particular combination flips from one phase denser to the other, and thereby one phase on top to the other phase, is the phase inversion temperature.

DETAILED DESCRIPTION OF THE INVENTION

An embodiment of the present invention is a method of selecting refrigerant and lubricant combinations in a heat transfer system, including but not limited to refrigeration vapor-compression-type systems, that incorporates at least one refrigerant and at least one lubricant. In a further embodiment of the present invention, the method of selecting refrigerant and lubricant combinations is such that a lower operating temperature range is selected where the refrigerant and lubricant form a single phase and an upper operating temperature range is selected where the refrigerant and lubricant phase separate into refrigerant-rich and lubricant-rich phases. In a further embodiment, the refrigerant lubricant phase inversion temperature is between the lower operating temperature and upper operating temperature ranges. In a traditional refrigeration vapor-compression system, such as in refrigeration or air conditioning systems, such lower and upper operating temperatures may be the evaporator discharge temperature and compressor discharge temperature respectively.

The present method of selecting refrigerant and lubricant combinations will promote efficient oil return in the heat transfer system and help maintain efficient performance. For example, in the evaporator of a refrigeration vapor-compression cycle, immiscibility between the refrigerant and lubricant can lead to oil logging and excess oil hold up, which can insulate the evaporator to heat transfer, reducing the system efficiency. If the lubricant and refrigerant are miscible, the lubricant tends to be passed from the evaporator and returned back to the compressor. Therefore, a preferred embodiment of the present invention is where the refrigerant and lubricant combination is miscible at the lower temperatures of the heat transfer system to minimize oil logging.

Another issue is the potential for oil collecting in the receivers or reservoirs of heat transfer systems. Typically, if the lubricant and refrigerant are immiscible, a lubricant-rich phase may float on the surface of the denser refrigerant-rich phase in receivers or reservoirs, this places the lubricant-rich phase above the suction line for return to the compressor. This can lead to collection of the lubricant in these reservoirs and subsequent drainage of lubricants from the compressor, which can result in insufficient lubrication of the compressor parts leading to excessive wear and premature failure. If the temperature of such reservoirs or receivers is sufficiently above the phase inversion temperature of the refrigerant-lubricant combination, the lubricant-rich phase will sink to the bottom and be collected back to the compressor, thereby ensuring efficient oil return. If the temperature in such reservoirs or receivers is at or near the phase inversion temperature of the refrigerant-lubricant combination, then the lubricant-rich and refrigerant-rich phases can form stable emulsions or mixtures with long settling times, again permitting efficient oil return. An embodiment of the present invention is that where the phase inversion point is between the upper and lower operating temperatures of the system and preferably near or below the temperature of the receiver or reservoirs such that a lubricant-rich upper layer phase does not form in the receivers or reservoirs.

The miscibility behavior of the refrigerant and lubricant is very important in the compressor of the heat transfer system, where the lubrication is essential for proper operation and maintaining equipment life. If dissolved refrigerant decreases the viscosity of the lubricant too much, there may be insufficient lubrication in the compressor leading to excessive wear and premature failure. Another concern is that of flooded starts, where the compressor sump is flooded with refrigerant after shutdown. During startup, the presence of refrigerant can reduce lubricant viscosity resulting in inadequate compressor lubrication. This is particularly a concern with immiscible refrigerant/lubricant systems where two layers can form in the compressor sump with the refrigerant layer on the bottom. The withdrawal point where lubricant is normally drawn into the compressor bearings is at the bottom. In a preferred embodiment of the present invention, the temperature in the compressor is above the phase inversion temperature, thereby limiting the chance that refrigerant will displace lubricant in the compressor sump which will aid lubrication and avoid many problems of flooded starts. In a separate embodiment, the temperature in the compressor during idle periods is such that the refrigerant and lubricant are miscible.

Though not meant to limit the scope of the present invention, refrigerants of the present invention include compositions comprising hydrofluorocarbons (HFCs), hydrofluoroolefins (HFOs), hydrochlorofluorocarbons (HCFOs), hydrochlorofluorocarbons (HCFCs), hydrocarbons (HCs), carbon dioxide, ammonia, dimethyl ether, and/or mixtures thereof. Preferably the refrigerant comprises a hydrofluoroolefin. More preferably, the a fluorinated C3 to C6 alkene, more preferably a fluorinated C3 to C4 alkene, even more preferably a tri-, tetra-, or pentafluoro-propene, and even more preferably a trifluoropropene, tetrafluoropropene, and/or mixtures thereof. Exemplary trifluoropropenes include 3,3,3-trifluoropropene (HFO-1243zf). Exemplary tetrafluoropropenes include 2,3,3,3-tetrafluoropropene (HFO-1234yf) and 1,3,3,3-tetrafluoropropene (HFO-1234ze). 1,3,3,3-tetrafluoropropene (HFO-1234ze) can include the cis-isomer, trans-isomer, and mixtures thereof; preferably 1,3,3,3-tetrafluoropropene is predominantly the trans-isomer.

Exemplary HFCs include, hut are not limited to, difluoromethane (HFC-32); 1-fluoroethane (HFC-161); 1,1-difluoroethane (HFC-152a); 1,2-difluoroethane (HFC-152); 1,1,1-trifluoroethane (HFC-143a); 1,1,2-trifluoroethane (HFC-143); 1,1,1,2-tetrafluoroethane (HFC-134a); 1,1,2,2-tetrafluoroethane (HFC-134); 1,1,1,2,2-pentafluoroethane (HFC-125); 1,1,1,3,3-pentafluoropropane (HFC-245fa); 1,1,2,2,3-pentafluoropropane (HFC-245ca); 1,1,1,2,3-pentafluoropropane (HFC-245eb); 1,1,1,3,3-hexafluoropropane (HFC-236fa); 1,1,1,2,3,3,3-heptafluoropropane (HFC-227ea); 1,1,1,3,3-pentafluorobutane (HFC-365mfc), 1,1,1,2,3,4,4,5,5,5-decafluoropropane (HFC-4310), and mixtures thereof. Exemplary hydrocarbons include, but are not limited to, propane, butane, isobutane, propylene, and mixtures thereof. Exemplary hydrochlorofluorocarbons include, but are not limited to, HCFC-22, HCFC-123, and mixtures thereof. Exemplary HCFOs include, but are not limited to, 1-chloro-3,3,3-trifluoropropene (HCFO-1233zd), preferably the trans-isomer, 2-chloro-3,3,3-trifluoropropene (HCFO-1233xf), and/or mixtures thereof.

Though not meant to limit the scope of the invention in any way, lubricants of the present invention, include but are not limited to: polyalkylene glycols (PAGs), polyol esters (POEs), polyvinyl ethers (PVEs), polyglycols, polyalkylene glycol esters, alkyl benzenes, mineral oils, polyalphaolefins, and/or mixtures thereof. PAG oils are preferably homopolymers or copolymers consisting of two or more oxypropylene groups. PAG oils can be 'un-capped', 'single-end capped', or 'double-end capped'. Examples of commercial PAG oils include, but are not limited to, ND-8, Castrol PAG 46, Castrol PAG 100, Castrol PAG 150, Daphne Hermetic PAG PL, Daphne Hermetic PAG PR. Example commercial POE oils include, but are not limited to, Emkarate POE RL 32H, Emkarate POE RL 68H, Copeland Ultra 22CC, Copeland Ultra 32CC. The preferred viscosity of the lubricating oil is from about 10 to about 200 centistokes.

Example of refrigerant/lubricant combinations within the scope of the present invention include:
HFO-1234yf/PAG
HFO-1234yf/POE
HFO-1234yf/PVE
HFO-1234ze/PAG
HFO-1234ze/POE
HFO-1234ze/PVE
HFO-1243zf/PAG
HFO-1243zf/POE
HFO-1243zf/PVE It is recognized the chemical composition of lubricants within the same family (eg. PAGs) can be different. Therefore, the miscibility behavior and inversion temperature can be different from one lubricant to the next even when used in combination with the same refrigerant. Therefore, the operation temperatures of the method of cooling of the present invention may change depending on the specific combinations of refrigerant and lubricant. A person of ordinary skill in the art would be able to determine the phase inversion temperature of a specific combination.

Heat transfer systems, including for refrigeration, air conditioning, and Liquid chilling, are operated with one portion of the cycle at a the lower operating temperature range and another part of the cycle at the upper operating temperature range. These upper and lower temperature ranges will depend on the specific application. For example, the operating temperatures for low temperature refrigeration may be different than for automotive air conditioning or for water chillers. Preferably, the upper operating temperature range is from about +15° C. to about +90° C., more preferably from about +30° C. to about +70° C. Preferably, the lower operating temperature range is from about +25° C. to about −60° C., more preferably from about +15° C. to about −30° C. For example, a low pressure liquid chiller may be operated at an evaporator temperature from about −10° C. to +10° C. and a condenser temperature from about +30° C. to +55° C. For example, an air conditioner, such as for automotive AC, may operate with an evaporating temperature at 4° C. and a condensing temperature of 40° C. For refrigeration, the lower operating temperature range may be depend upon the specific application. For instance, some typical application temperatures for refrigeration include: freezer (eg. ice cream): −15° F.+/−2° F. (−26° C.+/−1.1° C.); low temperature: 0° F.+/−2° F. (−18° C.+/−1.1° C.); medium temperature: 38° F.+/−2° F. (3.3° C.+/−1.1° C.). These examples are only informative and not meant to limit the scope of the present invention in any way. Other operating temperatures and operating temperature ranges may be employed within the scope of the present invention.

The compositions may also comprise additives, such as dyes, viscosity modifiers, anti-foaming agents, corrosion inhibitors, stabilizers, compatibilizers, anti-oxidants, pour point depressants, nanoparticles, flame suppressants and mixtures thereof.

Another embodiment of the present invention is a method of operating a heat transfer system with a refrigerant-lubricant combination. In one embodiment, one portion of the heat transfer system is operated at a lower operating temperature range where the refrigerant and lubricant form a single phase. Another portion of the heat transfer system is operated at an upper operating temperature range where the refrigerant and lubricant separate into a refrigerant-rich phase and a lubricant-rich phase. In this embodiment of the present invention, the heat transfer system is operated where the density phase inversion temperature of the refrigerant/lubricant combination is between the upper and lower operating temperatures.

Example 1

To a graduated pressure vessel was added approximately equal parts of HFO-1234yf and a commercial PAG lubricant (Castrol PAG 46). The components were mixed and allowed to sit at ambient temperature to equilibrate. At ambient temperature (~20° C.), the mixture was phase separated, with a lubricant-rich liquid phase floating on a refrigerant-rich liquid phase. To reduce the temperature of the mixture below ambient, the pressure vessel was placed in a contain temperature refrigerator or freezer and cooled until equilibrium was reached. At 8° C. the mixture was miscible, showing only a single liquid phase. At −20° C. the mixture was miscible with only a single liquid phase.

To raise the temperature of the mixture above ambient, the graduated pressure vessel was then placed in a constant temperature bath and heated in stages to from 25° C. to 50° C., allowed to reach equilibrium at each stage, and the vessel contents were periodically observed. The mixture contained two liquid phases. At 30° C. the two phases were very difficult to distinguish. At 35° C., the two phases were still difficult to distinguish but a liquid, refrigerant-rich phase was floating above a more lubricant-rich phase. At 40° C. and higher, the portion of the sample that was the refrigerant-rich phase had increased and the two phases were more easily distinguished.

The graduated pressure vessel was removed from the constant temperature bath and allowed to cool. As the vessel cooled, the refrigerant-rich phase was observed to sink to the bottom of the vessel.

This example shows that the combination of HFO-1234yf with Castrol PAG 46 is miscible from 8° C. to −20° C. while being immiscible at +20° C. and above, with a density phase inversion temperature of about +30° C.

Example 2

A vapor-compression air conditioning system can be operated using the refrigerant/lubricant combination of Example 1, where the refrigerant is HFO-1234yf and the lubricant is Castrol PAG 46. The lower operating temperature range could be from about +8° C. to about −20° C., while the upper operating temperature range could be from about 30° C. and above. The air conditioning system would be operated according to the present invention, where the evaporator temperature is maintained at 4° C.+/−2° C., and the condensing temperature is maintained at about 40° C. Using these operating conditions, the refrigerant and lubricant would be miscible at the coldest conditions in the air conditioning system while at the upper operating temperatures, the refrigerant and lubricant would be immiscible but where the refrigerant-rich phase is less dense.

The invention claimed is:
1. A method of operating a vapor-compression heat transfer system containing a refrigerant and a lubricant combination comprising:
    a. determining a lower, evaporator discharge operating temperature range of a vapor-compression heat transfer system;
    b. determining an upper, compressor discharge operating temperature range of the vapor-compression heat transfer system; and
    c. wherein said refrigerant is selected from hydrofluoroolefins (HFOs) selected from the group consisting of 3,3,3-trifluoropropene (HFO-1243zf), 2,3,3,3-tetrafluoropropene (HFO-1234yf) and 1,3,3,3-tetrafluoropropene (HFO-1234ze), or mixtures thereof at a first concentration and said lubricant is selected from polyalkylene glycols (PAGs), polyol esters (POEs), polyvinyl ethers (PVEs), polyglycols, polyalkylene glycol esters, alkyl benzenes, mineral oils, polyalphaolefins, or mixtures thereof at a second concentration and wherein said refrigerant and said lubricant are miscible at a first temperature within said lower, evaporator discharge operating temperature range of about −60° C. to about +25° C., and produce a fluid system having a refrigerant-rich phase and a lubricant-rich phase at a second temperature within said upper, compressor discharge operating temperature range of about +15° C. to about +90° C., provided that said second temperature is higher than said first temperature, wherein the lubricant-rich phase has a higher density than the refrigerant-rich phase at said second temperature and wherein a phase inversion temperature is between the lower, evaporator discharge operating temperature range and the upper, compressor discharge operating temperature range.
2. The method of claim 1 wherein said upper, compressor discharge operating temperature range is about +30° C. to about +70° C. and said lower, evaporator discharge temperature range is about −30° C. to about +15° C.
3. The method of claim 1 wherein said fluid system further comprises one or more of additives selected from the group consisting of dyes, viscosity modifiers, anti-foaming agents, corrosion inhibitors, stabilizers, compatibilizers, anti-oxidants, pour point depressants, nanoparticles, flame suppressants and mixtures thereof.

\* \* \* \* \*